(12) United States Patent
Yener

(10) Patent No.: US 6,772,337 B1
(45) Date of Patent: Aug. 3, 2004

(54) LIGHT WEIGHT SECURITY FOR PARALLEL ACCESS TO MULTIPLE MIRROR SITES

(75) Inventor: Bulent Yener, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/436,167

(22) Filed: Nov. 9, 1999

(51) Int. Cl.[7] .................................................. H04L 9/00
(52) U.S. Cl. ..................... 713/165; 380/279; 713/201
(58) Field of Search .................... 713/165, 164, 713/167, 201, 153; 380/277, 278, 279

(56) References Cited

U.S. PATENT DOCUMENTS 5,991,414 A * 11/1999 Garay et al. ................ 713/165
6,182,214 B1 * 1/2001 Hardjono ................... 713/163
6,192,472 B1 * 2/2001 Garay et al. ................ 713/165

* cited by examiner

Primary Examiner—Matthew Smithers

(57) ABSTRACT

A system and method for providing secured file dispersal and access control protocols based on combinatorial techniques to reduce the security overhead associated with information retrieval systems employing parallel access to mirror sites. In one aspect, a system for providing secured access to information on a network comprises a plurality of mirror servers; and at least one trusted authority (TA) server comprising file partition means for partitioning a file into a plurality of elements; combinatorial file dispersal means for permuting the elements of the file and assigning each of the permuted elements to at least one of a plurality of blocks; distribution means for distributing the plurality of blocks to at least a portion of the plurality of mirror servers; and key generation means for generating a combinatorial key comprising access information for accessing the mirror servers having blocks of the file and reconstruction information for reconstructing the file from at least a portion of the plurality of blocks.

25 Claims, 6 Drawing Sheets

*FIG. 3*

EXAMPLE FOR CLONING BASED DISPERSAL

ASSUMING THAT:

NUMBER OF ELEMENTS v = 9

NUMBER OF BLOCKS k = 3

INDEXED FILE ELEMENTS:   0, 1, 2, 3, 4, 5, 6, 7, 8

PERMUTATION FOR EACH COPY:   0, 1, 2, 3, 7, 8, 4, 5, 6

| 0 | 1 | 2 | 3 | 4 | 5 | 6 | 7 | 8 | 9 | 10 | 11 | 12 |
|---|---|---|---|---|---|---|---|---|---|----|----|----|
| X | X | X | 0 | X | X | 1 | X | X | X | 2  | X  | X  |

↓  ↙
JUNK ELEMENT

BLOCK 1

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| X | X | X | 3 | X | X | X | X | 7 | X | X  | 8  | X  | X  |

BLOCK 2

| 0 | 1 | 2 | 3 | 4 | 5 | 6 | 7 | 8 | 9 | 10 |
|---|---|---|---|---|---|---|---|---|---|----|
| 4 | X | X | X | 5 | X | X | X | X | 6 | X  |

BLOCK 3

COMBINATIONAL KEY:

<FID,9,[ServerAddress,(0,3);(1,6);(2,10)],[ServerAddress,(3,3);(7,8);(8,11)],[ServerAddress,(4,0);(5,4);(6,9)]>

FIG. 4

EXAMPLE FOR RESOLVABLE BIBD

ASSUMING (9,3,1) DESIGN BASED ON AG(2,3)

BLOCK DESIGN:

B0 = {0,1,2}  B1 = {1,3,4}  B2 = {4,5,6}  B3 = {0,4,7}  B4 = {1,6,8}  B6 = {3,7,8}

B7 = {2,4,8}  B8 = {0,3,6}  B9 = {1,5,7}  B10 = {0,5,8}  B11 = {2,3,5}

CONSTRUCTION OF RESOLVABLE DESIGN:

$\underbrace{\{0,1,2\} \quad \{3,7,8\} \quad \{4,5,6\}}_{P_1} \quad \underbrace{\{0,4,7\} \quad \{2,3,5\} \quad \{1,6,8\}}_{P_2} \quad \underbrace{\{0,3,6\} \quad \{1,5,7\} \quad \{2,4,8\}}_{P_3} \quad \underbrace{\{0,5,8\} \quad \{1,3,4\} \quad \{2,6,7\}}_{P_4}$

B0   B6   B2      B3   B11  B4      B8   B9   B7      B10  B1   B5

LIGHT WEIGHT SECURITY FOR PARALLEL ACCESS TO MULTIPLE MIRROR SITES

BACKGROUND

1. Technical Field

The present application relates generally to a system and method for secured access of information over a computer network and, more particularly, a system and method for accessing information from multiple mirror sites using combinatorial file dispersal and access control protocols to reduce the security overheard associated with information access.

2. Description of Related Art

Due to the increasing demand for distributed information services and applications over the Internet (e.g., software distribution, World Wide Web (WWW), Distributed Interactive Simulations (DIS)), new methods for reducing server load and access delay are continually being developed. Conventional techniques for reducing server load and access delay are typically based on redundancy and efficient dispersal of information over the network. For example, in one conventional method known as the "mirror site," multiple copies of a file in the network are maintained at a plurality of servers so as to provide (i) load balancing at network servers, (ii) faster response to a user request, and (iii) increased fault-tolerance. In particular, with the "mirror site" method, a client will select a single server from a plurality of servers and send a request for information. This server selection process is not trivial and two selection methods have been proposed for improving the performance: (1) a static approach based on statistical information (see, e.g., Katz et al., "*Spand: Shared Passive Network Performance Discovery,*" Proc. of Usenix Symposium on Internet Technologies and Systems '97, December) and (2) a dynamic approach based on probing to determine the "closest" site to direct the request (see, e.g., Carter, et al., "*Dynamic Server Selection Using Bandwidth Probing in Wide-Area Networks,*" Proc. of IEEE INFOCOM97)

The delay associated with downloading a file can be further decreased by polling multiple servers in parallel. However, this approach has the potential of causing congestion if the servers send back the entire file. Thus, to prevent congestion, mechanisms are needed that allow the servers to send only subsets of packets of the file. One solution would be to have a client instruct each server to send a specific subset of packets to the client. Of course this approach would require negotiations and may not be scalable due to increased security overhead. Another solution is to disperse the file into fixed size pieces at each server in a predetermined way, wherein some redundancy is introduced during the dispersal such that a client can recover the file upon receiving a limited number of pieces. Current solutions to provide parallel access to multiple servers are based on partitioning a file into b pieces using Forward Error Correction (FEC) codes or their variants. Such a scheme is used in the context of multicasting (see, e.g., Nonnenmacher, et al., "*Parity-Based Loss Recovery For Reliable Multicast Transmission,*" Proc. of ACM SIGCOMM'97, and Vicisano, et al., "*Tcp-Like Congestion Control For Layered Multicast Data Transfer,*" Proc. of INFOCOM'98).

In particular, one approach known as the Information Dispersal Algorithm (IDA), represents the common theme in FEC based approaches (see M. O. Rabin, "Efficient Dispersal of Information for Security, Load Balancing, and Fault Tolerance," Jrn. ACM, 36-2:335–348, 1989). With the IDA method, a file of length F is partitioned into b pieces such that (i) each piece has length F/m, (ii) no m−1 pieces are sufficient to reconstruct the file, and (iii) any m pieces are sufficient to reconstruct the file. Recently, a new parallel access scheme was proposed to increase the download speed from multiple mirror sites (see, e.g., Byers, et al., *Accessing Multiple Mirror Sites In parallel Using Tornado Codes to Speed Up Downloads,*" Proc. of INFOCOM'99; and Byers, et al., "*A Digital Fountain Approach To Reliable Distribution of Bulk Data*", Proc. of ACM SIGCOMM'98). This work was based on Tornado Codes (TC) (see Luby et al., "*Practical Loss-Resilient Codes*", Proc. of ACM STOC'97), which is a relaxation of Forward Error Correction codes (FEC) with reduced complexity.

As the Internet becomes increasingly commercialized, protection of the information from unauthorized users is needed. There are several protocols proposed for secure directory access such as the X.500 DAP (see, e.g., International Organization for Standardization, "*Information Technology OSI-The Directory,*" ISO/IEC9594-3, ISO/IEC9594-8) and the LDAP (see, e.g., Kille et al., "*Lightweight Directory Access Protocol* (v3)," RFC 2251). The complexity of security is increased with the implementation of mirror sites because each server that is polled by the client for accessing a file must perform a separate client authorization and authentication process. In addition, the charging to clients for downloading the file in such an environment introduces further overhead. Indeed, the FEC based methods, in particular, require cryptographic protection since, as indicated above, any m pieces of the file is sufficient to reconstruct the file. Thus, as the information (file) becomes redundant, replicated and distributed a new bottleneck occurs due to the added security overhead.

Accordingly, a system and method which provides secured access to information in a network using a dispersal and parallel access paradigm, but which provides reduced security overhead in connection with client access of a file from a plurality of mirror servers, is highly desirable.

SUMMARY OF THE INVENTION

The present invention is directed to a system and method for providing secured file dispersal and access control protocols based on combinatorial techniques so as to reduce the security overhead associated with information retrieval systems employing parallel access to mirror sites.

In one aspect of the present invention, a system for providing secured access to information on a network comprises a plurality of mirror servers; and at least one trusted authority (TA) server comprising file partition means for partitioning a file into a plurality of elements; combinatorial file dispersal means for permuting the elements of the file and assigning each of the permuted elements to at least one of a plurality of blocks; distribution means for distributing the plurality of blocks to at least a portion of the plurality of mirror servers; and key generation means for generating a combinatorial key comprising access information for accessing the mirror servers having blocks of the file and reconstruction information for reconstructing the file from at least a portion of the plurality of blocks.

In accordance with another aspect of the present invention, a combinatorial dispersal process employs one of a (i) cloning-based process which uses random permutations of file elements, and (ii) Balanced Incomplete Block Design (BIBD)—based process which uses deterministic permutations of file elements. A BIBD process implements combinatorial design theory to ensure that each block is unique and elements in a block have different ordering.

In another aspect of the present invention, the combinatorial dispersal of file elements into a plurality of blocks k provides the properties: (i) no k−1 blocks are sufficient to reconstruct the file and k blocks are needed and (ii) not any k blocks are sufficient to recover the file (i.e., there are only k+1 combinations (configurations) that can reconstruct the file by using k blocks), and (iii) there is no redundancy information within a block. The present invention provides protocols that capitalize on (ii) to reduce the security overhead.

In yet another aspect of the present invention, the combinatorial file dispersal process includes inserting a random amount of junk elements in each of the blocks to hide the number of file elements assigned to each block.

Advantageously, since the file blocks are dispersed over a plurality of mirror servers in a combinatorial manner, the probability of an adversary being able to successfully guess a combination of the blocks to reconstruct the file is sufficiently low. In addition, since an adversary does not know the configurations of the blocks, there is an added security factor which further decreases the probability of an adversary being able to reconstruct a file. Consequently, the servers do not have to perform any authentication and/or authorization process for client access of a file, thereby eliminating the cost and complexity associated with key management and authorization procedures between a client and the mirror sites.

These and other aspects, features and advantages of the present invention will be described and become apparent from the following detailed description of preferred embodiments, which is to be read in connection with the accompanying drawings.

BRIEF DESCRIPTION OF THE DRAWINGS

FIG. 3 is an exemplary diagram of a method for permuting file elements according to one aspect of the present invention using a cloning-based process;

FIG. 4 is an exemplary diagram of a method for permuting file elements according to another aspect of the present invention using a BIBD (balanced incomplete block design) process;

DETAILED DESCRIPTION OF PREFERRED EMBODIMENTS

It is to be understood that the systems and methods described herein in accordance with the present invention may be implemented in various forms of hardware, software, firmware, special purpose processors, or a combination thereof. Preferably, the present invention is implemented in software as an application (local and/or distributed) comprising program instructions that are tangibly embodied on one or more program storage devices (e.g.,
magnetic floppy disk, RAM, CD ROM, ROM and Flash memory), and executable by any device or machine comprising suitable architecture. It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
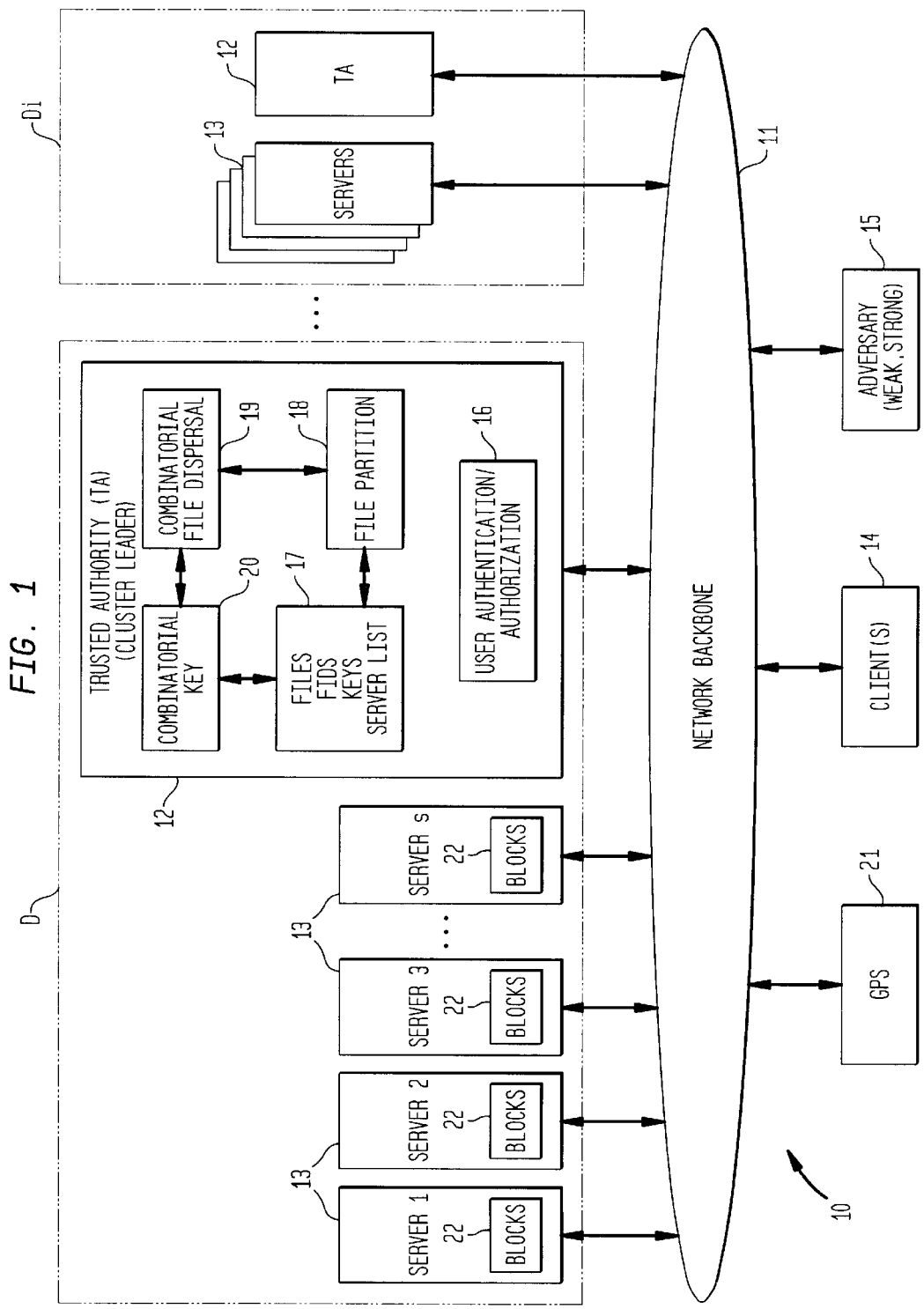
FIG. 1 is a diagram of a system for providing secured access to information on a network according to an embodiment of the present invention.

Referring now to FIG. 1, a block diagram illustrates a system for providing secured access to information in a network according to an embodiment of the present invention.

The system 10 comprises a network 11 that is partitioned into one or more domains (denoted as D . . . Di) or clusters.

Each domain D . . . Di includes a trusted authority (TA) 12 and a plurality of mirror servers 13. Each domain (cluster) . . . Ss) preferably comprises s number of mirror servers 13 (e.g., S1 and the network 11 comprises a total of S mirror servers 13. In the illustrative embodiment, the mirror servers 13 are assumed to be trusted entities. It is to be understood that the number of servers s in each domain may be equal or random with some domains having an equal amount of servers, etc. Each TA 12 is considered a cluster leader for its respective domain D . . . Di.

Each TA 12 comprises an authentication/authorization module 16 for authenticating the identity of a user upon accessing the TA 12. It is to be understood that the user authentication module 16 may employ any conventional security mechanism (e.g., PIN (personal identification number), password, speaker recognition, digital signature, etc.)

It is to be appreciated that in accordance with the present invention, each TA 12 is considered to be an "owner" or manager of one or more files f. The TA 12 maintains a directory 17 comprising information such as a file identifier (FID)for each file f in its cluster, a combinatorial key for each file f and a list of the mirror servers 13 that hold blocks of parallel classes (or copies) of the files f (as explained in below).

To provide scalability, it is preferable to limit the amount of information maintained at each TA 12. Thus, it is not required that each TA 12 knows about all the files in the network 11 (i.e., files in other domains that are managed by the respective TAs 12). It is to be appreciated, however, that more than one TA 12 may be assigned the responsibility of managing a given file f for reasons understood by those skilled in the art (e.g., to increase fault-tolerance). It is to be further appreciated that the directories 17 of all the TAs 12 in the network 11 can be managed by hierarchically organizing the TAs 12 into a virtual tree structure using any conventional method known by those skilled in the art such as the method disclosed in *A Trade-Off Between Space and Efficiency for Routing Tables*," by Peleg et al., Jrn. ACM, pp.510–530, 1989. Briefly, with this method, the amount of information maintained at each TA 12 depends on its level in the tree. Each node in the tree keeps the topology and file database for the subtree rooted at this node (i.e., the root of the tree knows the global information). Using such information, each TA 12 can perform routing and forwarding operations in a similar way to a gateway (border router) and can filter out messages.

Each TA 12 is responsible for partitioning and dispersing the files f (that it manages) to the mirror servers 13 within its domain. In particular, each TA 12 comprises a file partition module 18 for partitioning a file f into a set of v elements ($e_1, e_2, \ldots, e_v$). The file f can be replicated to make r copies thus resulting in a total number of vr elements. Each element of the file is a logical unit of information. For example, an element of an electronic encyclopedia can be pages that cover topics that start with the letters between $A_a$–$A_k$. In addition, if the file f comprises a multi-media book, each element may partitioned to correspond to a chapter or a section. It is to be understood that the granularity of the information contained in each element is outside the scope of the present invention and that any conventional partitioning technique known in the art may be implemented in the file partition module 18.

Each TA 12 further comprises a combinatorial file dispersal module 19 for permutating elements of a given file and generating blocks 22 (or pieces) of the file elements, which are dispersed to (and stored within) the mirror servers 13. These blocks 22 may comprises "valid" blocks and/or "junk" blocks. In particular, for a given file f, each server may have either a "valid" block (i.e., a piece of the file f that is provided by the TA 12) or a "junk" a block if the server has nothing to do with the file f. A junk block may comprise random information and is generated by the server. As discussed below, a junk block is used to confuse an adversary. A server 13 is considered a "holder" if it maintains a valid block of the file f. These concepts will be addressed in more detail below with reference to the file dispersal and access methods discussed herein in accordance with the present invention. Various dispersal processes that may be implemented by the file dispersal module 19 include a cloning-based and BIBD-based process, both of which are discussed in detail below with reference to FIGS. 2, 3, and 4. For each file, the combinatorial file dispersal process of module 19 results in a combinatorial key 20 which comprises the dispersal and reconstruction information for each file (also discussed in detail below).

The combinatorial keys 20 are maintained in the directory 17 of the TA 12.

The system 10 of FIG. 1 further comprises one or more clients 14 (authorized users) and one or more adversaries 15 (unauthorized users). It is assumed that the identity of the servers 13 in the network 11 are not known to the clients 14 and that their knowledge is limited to the address of their respective TAs 12. For a given file f, a client 21 is considered "honest" if it is not corrupted by an adversary 15. A client 14 is considered "legitimate" if it has paid for service. It is assumed herein that all legitimate clients 14 are also honest. Furthermore, it is assumed that an honest client does not provide any information regarding a file (or the reconstructed file itself) to any other client (e.g., it is assumed that there is no second hand sale of a given file).

There are two variants of an adversary 15 referred to herein. A "weak" adversary refers to an adversary that can corrupt other clients 14 for collaboration and initiate replay attacks. A "strong" adversary refers to an adversary that has the capability of eavesdropping on data traffic that flows in and out of any node in the network 11 (as well as the capabilities of the weak adversary). It is assumed that an adversary 15 can corrupt at most d clients 14. However, the adversary cannot change the set of corrupted clients at each time interval (i.e., it is not mobile).

It is assumed that the network 11 is synchronized. One conventional method for providing synchronization which may be implemented in accordance with the present invention is based on a global referencing structure such as GPS (global positioning system) 21, whereby each node (e.g., servers 13, TA 12, client 21) of the network 11 receives clock ticks from a GPS receiver to synchronize its internal clock. It is assumed that GPS signals are unforgeable. The time between two successive GPS ticks is called a Time Frame (TF). In addition, a time cycle (TC) is defined as a period of time comprising θ TFs. Intuitively, a time cycle is long enough to subsume multiple round trip times (RTT) between a server 13 and a client 14 in the network. Each TC is associated with a monotone increasing sequence number. In addition, a time stamp (TS) is considered the next TC's sequence number. Time stamps are utilized in connection with the access control protocols of the present invention as described in detail below with reference to, e.g., FIGS. 5 and 6. Therefore, synchronization of the network 11 implies that the sequence numbers for successive TCs are incremented consistently throughout the network.

In addition, the present invention utilizes a conventional mechanism for client 14 access (i.e., polling) to a server 13 such as HTTP (hypertext transfer protocol or FTP (file transfer protocol) connection. It is assumed that each polling message has a fixed cost $c. In this regard, any suitable conventional charging mechanism for charging clients 14 for file access may be employed herein. One such method is a usage-based charging mechanism associated with accessing to the network (such as described in "*Internet Cost Allocation and Pricing*" by D. Clark, Internet Economics, L. W. McKnight and J. P. Bailey (eds.), pp. 215–252, 1997. With this method, a network service provider can identify and charge different user traffic flow (e.g., HTTP or FTP) at the network ingress points. In addition, there is a service charge for accessing a file. The latter may be done by the owner of the file (e.g., the owner of the multimedia text book).

An adversary 15 tries to "guess" the servers 13 that maintain a copy of a file that the adversary wants to access. Each adversary 15, however, is assumed to be polynomial time-bounded and have a large, but finite, budget $B. It is further assumed that an adversary 15 is not adaptive and it makes d guesses at once (i.e., not one guess at a time). The objective of an adversary 15 is to improperly obtain the file and pay less than the full price of the service (i.e., accessing a file). Consider a file f which is composed of |f|=v elements. In accordance with one aspect of the present invention (discussed below), the file can be replicated to make r copies, thus resulting in a total of vr elements that are dispersed among the servers 13. Accessing the file requires obtaining at least v elements and providing these elements defines a service which has a certain price. An honest client is willing to pay the price for obtaining the service. Is assumed that the file has a binary value such that it is valuable as a whole and not valuable in any portion thereof. This assumption can be related to the quality of service (QoS) requirement of the application requesting this file (e.g., obtaining some parts of the 9'th Symphony is considered to be worthless for the QoS). Accordingly, as explained in detail below, the present invention provides a combinatorial dispersal mechanism which makes the cost of random polling of the servers 13 (e.g., $c for each polling message) to obtain the appropriate amount of blocks for reconstructing the file too expensive for the adversary having the finite budget $B.

Figure 2:
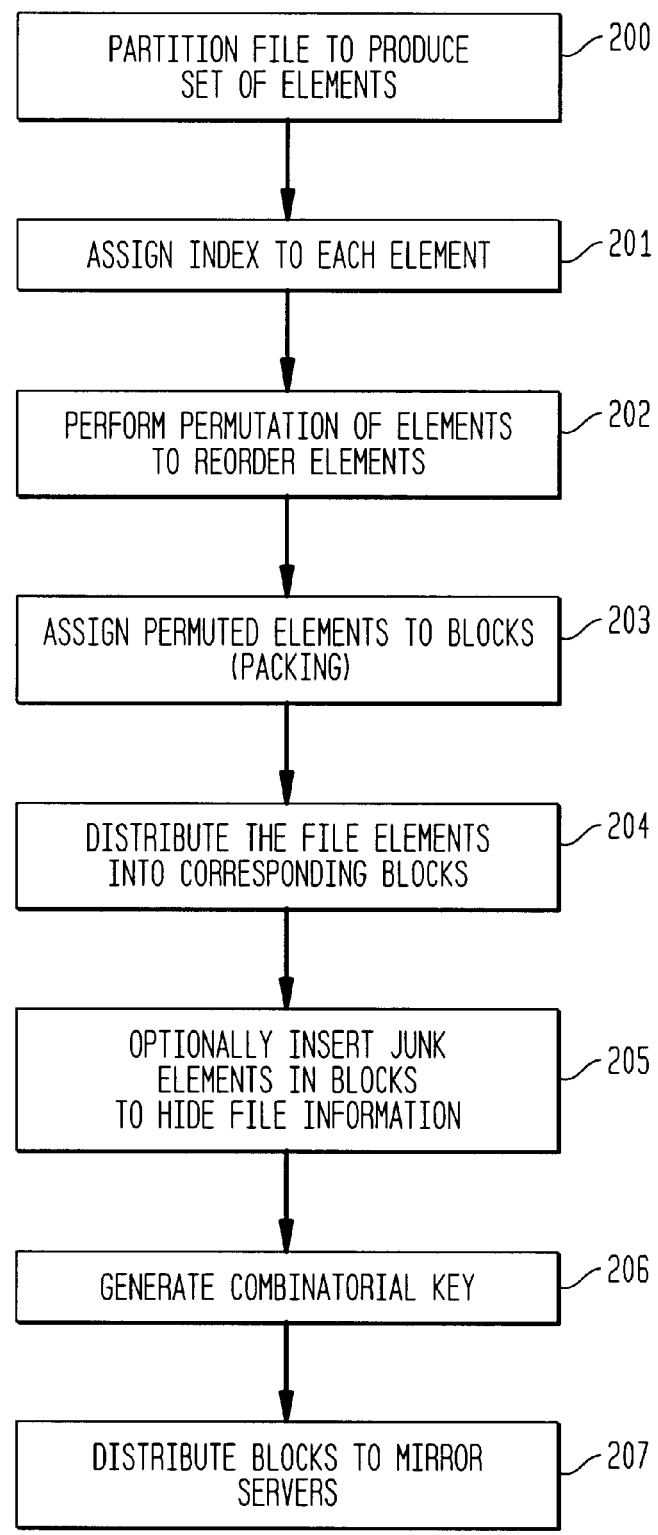
FIG. 2 is a flow diagram of a file dispersal process according to one aspect of the present invention.

Referring now to FIG. 2, a flow diagram illustrates a combinatorial file dispersal process according to one aspect of the present invention. This process is performed by a TA 12 for each file it manages. The flow diagram of FIG. 2 illustrates, in general, two combinatorial file dispersal methods (CFDs) that are preferably implemented herein: (i) a cloning based dispersal method, and (ii)a BIBD-based dispersal method. The method of FIG. 2 is generally similar for both combinatorial dispersal methods except with respect to the permutation (step 202) of file elements as explained below.

Initially, for a given file f, the TA 12 will partition the file (via file partition module 18) to produce a set of elements (step 200). Let $e_1, e_2 \ldots, e_v$, be the set of elements of a given file f. As stated above, partition methods are well-known in the art and vary based on the given application and file content. The next step is to assign an index to each element v of the partitioned file f (step 201). Once the indices are assigned, the indices of the file elements are permuted to reorder the information (step 202). In accordance with one aspect of the present invention, the cloning-based process randomly permutes the elements and uses the same random permutation for each copy of the file f. In accordance with another aspect of the present invention, the BIBD-based process employs conventional combinatorial design techniques for deterministically permutating the file elements. This method provides a unique permutation for each copy of the file and maintains well-defined properties between the blocks of different copies. Each of these permutation methods will now be discussed in detail.

Cloning Based Dispersal

A cloning-based permutation (step 202) and block assignment process (203) will now be explained in detail with reference to FIG. 3. Assuming that the given file f is partitioned into a set of elements $e_1, e_2, \ldots, e_v$, each having a unique index. Assume $\pi_i$ is a random permutation of the element indices which is used for dispersing an i th copy of the file. With the cloning-based dispersal method, if the file is replicated to generate r copies, the same permutation $\pi$ is used for each copy. Alternatively, with the BIBD-based dispersal method, a different random permutation $\pi_i$ is selected for each copy i=1, 2, . . . , r of the file.

Once the file elements (element indices) are permuted (step 202), the permuted indices are assigned (or packed) into k blocks (or pieces) (step 203). A block is considered a one-dimensional array that includes at least v/k elements.

The choice of parameter k (i.e., number of blocks) depends on the file size and number of mirror servers 13 in the domain.

Consider the example in FIG. 3 which assumes a file having 9 elements (v=9) with indices 0, 1, . . . 8. In this example, the number of blocks k=3. As shown in FIG. 3, the first three indices of the "permutation for each copy" are (0,1,2), which represents the file elements that are assigned to Block 1. The next three indices of the permutation (3,7,8) represent the file elements that are assigned to Block 2. The last three indices of the permutation (4,5,6) are assigned to Block 3. With the cloning-based dispersal process, the block design (Block 1, 2 and 3) is the same for each copy of the file f. Thus, the blocks associated with a given permutation define a copy of the file. The dispersal of a copy of file f is an assignment of each of the k blocks to k<<s mirror servers 13 such that a server obtains at most one block.

Block Design Based Dispersal

Another combinatorial dispersal process which may be employed in accordance with the present invention for permuting the file elements is a Balanced Incomplete Block Designs (BIBD), which utilizes a deterministic permutation technique based on combinatorial design theory, which is well-known by those skilled in the art. A discussion of such theory may be found, for example, in the following references: I. Anderson, "*Combinatorial Designs: Construction Methods*," John Wiley Sons, New York, 1990; M. Hall, "*Combinatorial Theory*," John Wiley Sons, New York, 1986; and W. D. Wallis, "*Combinatorial Designs*," Marcel Dekker, Inc., New York, 1988, which are incorporated herein by reference.

A BIBD is a collection of k-element subsets (or blocks) of a v-element set S. k<v, such that each pair of elements of set S occur together in exactly λ of the blocks. In a (v, b, r, k λ) BIBD with b blocks and v elements, each element occurs in r blocks where bk=vr; λ(v−1)=r(k−1).

As a short hand notation, a BIBD can be represented with parameters (v, k, λ).

In particular, the present invention preferably utilizes block designs that are resolvable. A BIBD is resolvable if its block can be arranged into r groups (called parallel classes) so that $$\frac{b}{r} = \frac{v}{k}$$

blocks of each group are disjoint and contain in their union each element exactly once. Resolvable BIBDs used herein have parameters ($n^2$, n, 1). For example, in the illustrative diagram of FIG. 4, a BIBD is shown with parameters (9,3,1) together with its parallel classes P1, P2, P3 and P4. It is understood that there are standard methods for actual construction of a BIBD based on finite fields. For example, a (13, 4, 1) design can be constructed by 0,1,3,9 (mod 13), PG(2,3). A resolvable design with parameters (9,3,1) can be obtained by deleting a block of the (13, 4, 1) design.

Parameter v of a resolvable BIBD is associated with the number of elements in the file while parameter k of the BIBD is the minimum number of pieces (or blocks) necessary to construct the file. Note that each parallel class of a resolvable design provides first a permutation of the indices of the elements and then packing them into blocks k blocks each with k elements. Furthermore, BIBD provides k+1=r copies of the file. For example, as shown in FIG. 4, there are r=4 different permutations of the file indices (i.e., a random permutation for each parallel class P1, P2, P2 and P4):
(0,1,2,3,7,8,4,5,6) for blocks B0, B6 and B2;
(0,4,7,2,3,5,1,6,8) for blocks B3, B11 and B4;
(0,3,6,1,5,7,2,4,8) for blocks B8, B9 and B7; and
(0,5,8,1,3,4,2,6,7) for blocks B10, B1 and B5.

In addition, the block design based dispersal method can be perceived as a special case of the cloning method algorithm such that each of the r copies of the file have a unique permutation of the elements such that a pair of blocks from two different copies have exactly one common element. For instance, as illustrated in FIG. 4, blocks B0, B3 and B8 and B10 (the first block in each copy) have the common element associated with index 0. In contrast, the cloning method ensures that some pair of inter-copy blocks have empty intersection. If the intersection is not empty, then the cardinality is at least k. It is to be understood that the terms parallel class (PC) and a copy of the file are used herein interchangeably.

It is to be appreciated that a BIBD-based CFD algorithm breaks a file with $n^2$ elements into $n^2+n$ pieces such that (i) any n−1 pieces are not sufficient for reconstruction (ii) there are exactly n+1 ways for reconstruction by using only n pieces. The reason for this is as follows.

Consider a CFD based on a resolvable design with parameters ($n^2$, n, 1) (such as illustrated by the exemplary (9,3,1) design of FIG. 4). Each block has n elements (e.g., n=3) thus n−1 blocks can reconstruct only $n^2-n$ elements. Since the file has $n^2$ elements (e.g., 9 elements), the above statement (i) holds. There are n blocks within each parallel class (i.e., for each copy as discussed above) and each block has n characters. It is to be noted that the blocks of a parallel class are mutually disjoint. Otherwise the blocks cannot cover $n^2$ elements total, which is a contradiction to the definition of resolvability. Second, by definition, a block can occur in only one parallel class.

Thus, each parallel class provides a unique way of constructing all the $n^2=D$ elements. Since there are total $r=n+1$ parallel classes, the above statement (ii) holds.

In addition, it is to be appreciated that, at most, $n^2$ pieces are needed for reconstructing the file. Consider deleting all the blocks having a particular element e. Since e is included in every parallel class, each class will loose exactly one block. Since there are $n^2+n$ blocks, and $r=n+1$ blocks are deleted, a total $n^2+n-n-1=n^2-1$ blocks will not be sufficient for reconstruction but any $n^2$ blocks will be sufficient for reconstruction.

Note that for a scalable application of BIBD to file dispersal, the number of elements and the number of pieces are made independent from each other. There are several methods to scale the combinatorial dispersal. For example the number of elements can be arbitrarily increased by increasing the size of the block for a given resolvable design. Alternatively, several block designs can be merged for scaling of BIBDs to achieve networks of arbitrary size such as explained in "*Combinatorial Design of Congestion-Free Networks*, by B. Yener, et al., *IEEE/ACM Transactions on Networking*, 5(6):989–1000, December 1997, which is incorporated herein by reference.

Referring again to FIG. 2, once the element indices are permuted and packed (assigned) to blocks (steps 202 and 203), the next step is to distribute the elements of the file into corresponding blocks (step 204) in accordance with the index assignment. In addition, the block size and the offset of each valid element can be hidden within each block by inserting "junk elements" randomly in each block (step 205). It is to be understood that this may be performed to enhance security against a strong adversary which, as indicated above, has the capability of eavesdropping and corrupting clients. To hide the number of elements in a block, a random number of "junk" elements are inserted in each block. The objective of junk elements is to confuse the adversary. Consequently, a junk element should be indistinguishable from the actual file contents, and contain "false" information. For instance, assuming that a file element in a given block is a paragraph starting with the sentence: Bob saw Alice running to the car to double park . . . . A junk element can be constructed by changing the sentences and rearranging the words randomly. In a digital movie, a junk element may be generated by randomly changing the order of clips.

In accordance with one aspect of the present invention, the number of junk elements can be chosen as a function of actual block size (i.e., the number of valid elements) as follows. For instance, for each block $b_i$ with k elements, a number j can be selected uniformly and randomly between k and L where $L=g(k)$ for a system defined function g. For example, in FIG. 3, the size of Block 1 is increased to 13, notwithstanding that Block 1 comprises 3 valid elements.

It is to be understood that there is a trade off between the block size, which improves the security properties, and the bandwidth waste due to the junk elements. It is to be appreciated that the function g(k) can be chosen by the network operators to address this trade off.

Next, the size of bi is increased to k+j by adding junk elements. The valid and junk elements can be packed into a block of size k+j elements by choosing a random index between 1 and k+j. For example, Block 1 of FIG. 3 includes elements of the file in locations (offsets) 3, 6, and 10. It is to be appreciated that (as shown in FIG. 3) each block has a different size. It is to be appreciated that such property (different block sizes with junk elements) is another aspect of the invention which provides added security against attack by a strong adversary.

It is to be understood that there is a difference between the terms "junk block" and "junk element" as used herein. As explained above, a "junk block" is sent by a non-holder server as a response to a polling message whereas a "junk element" is used to modify a valid block which is sent by a "holder" server.

Referring again to FIG. 2, the permutation and packing of the indices provides the information needed to generate a combinatorial key (step 206) for dispersal and construction of each copy of the file. For example, in FIG. 3, an exemplary combinatorial key for file based on the illustrated block design is shown as follows:

<FID,9,[Server Address,(0,3);(1,6);(2,10)],[Server Address,(3,3);(7,8);(8,1 1)][Server Address, (4,0);(5, 4); (6,9)]>

As shown above, for a given file, the combinatorial key comprises information such as (1) a FID (file identifier), (2) the number of elements for the file (which is 9 in the example), (3) the server address (e.g., IP (Internet protocol) of each mirror server 13, and (4) the index and offset of each file element in the block held by the corresponding mirror server. For example, the combinatorial key of FIG. 3 (as shown above) indicates that a first server (server address) holds a block (e.g. Block 1) of the file specified by FID such that the block contains element 0 at offset location 3, element 1 at offset location 6 and element 2 at offset location 10 in the block.

It is to be appreciated that instead of inserting junk elements within the blocks to hide the size and content of such blocks, the TA can utilize a secret key to encrypt the block. This secret key can subsequently be provided to the client to decrypt the blocks. An advantage to using the secret key to hide the size and content of the blocks is to decrease the bandwidth associated with sending junk information.

Once the blocks and combinatorial key of a given file are generated, the TA 12 will distribute the blocks to the mirror servers 13 (step 207). A TA 12 will distribute the blocks by communicating a download message (LOAD) to each server. The LOAD message is secured against a strong adversary using a public key of the server. It is to be appreciated that any suitable conventional method may be used to distribute the blocks to the appropriate mirror servers. For instance, in one embodiment of the present, the process for distributing the file to mirror sites is a variant of the well-known conventional NP hard problem as discussed in "*Computers and Intractability—A Guide to the Theory of NP-Completeness*," by M. R. Garey, et al., page 9, W. H. Freeman and Company, New York, 1979, which is incorporated herein by reference.

In general, after a file has been processed and dispersed to the mirror servers (as discussed above with respect the process depicted by FIG. 2), a client can access the blocks from the mirror servers and reconstruct the file using the appropriate combinatorial key. There are two general aspects to successful access and reconstruction of a file. First, enough blocks of the file should be obtained from the appropriate mirror servers. Second, the content of each block must be sorted by the client to obtain correct information. These aspects will now be discussed in greater detail.

Figure 5:
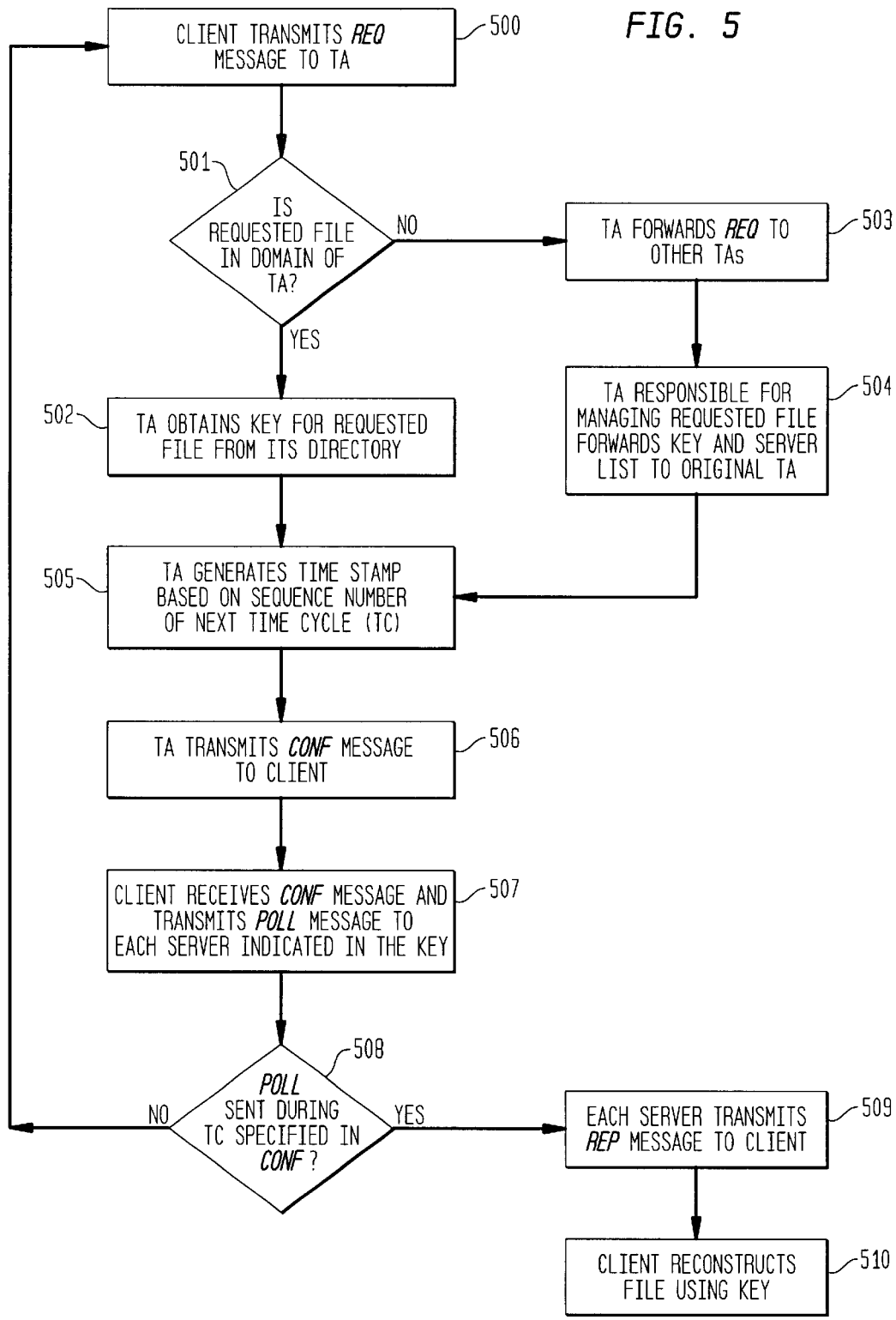
FIG. 5 is a flow diagram of a method for accessing and reconstructing a file according to one aspect of the present invention.

Referring now to FIG. 5, a flow diagram illustrates a method for accessing and reconstructing a file according to one aspect of the present invention. In general, the communication between a client 14 and its TA 12 involves the exchange of a request (REQ) message (by the client 14) and a confirmation (CONF) message (by the TA 12). More specifically, in FIG. 5, a client 14 seeking access to a given file will, initially, send a REQ message to its TA (step 500). A REQ message according to one aspect of the present invention comprises information in the following form:

<Address (C), $K_c$, FileName, PaymentInfo> where Address (C) is the IP address of the client, $K_c$ is the public key of the client, FileName is the name of the requested file, and the PaymentInfo is payment (e.g., credit card) information. It is assumed that the client knows the name and the price of the file which, indeed, is typically advertised in network.

After the TA receives the REQ message, the TA will determine if the requested file is one that is managed by the TA (step 501) (i.e., if the file is within the domain of the TA). In particular, based on the FileName in the REQ message, the TA will search its directory using the corresponding FID as a key. As explained above, each TA behaves as a domain (cluster) leader and manages each file in its domain by maintaining a directory with the following information: (1) file identifier (FID), (2) combinatorial key for the file (3) list of servers holding the blocks of the parallel class. Since not every domain has a copy of each file, a TA may need to poll other TAs to obtain a file that is not within the domain of the TA.

Thus, upon receiving a REQ message, the TA checks its directory to determine if the file is within its domain (cluster) (step 501). If the requested file is within the domain of the TA (affirmative result in step 501) (i.e., the TA manages the file), the TA will obtain from its directory the (previously generated) combinatorial key corresponding to the requested file (step 502). If, on the other hand, the requested file is not within the domain of the TA (negative result in step 501) (i.e., the request is for a remote file) then the TA forwards the request hierarchically to other TAs in the network (step 503). If the requested file is found in one of the remote TAs, then the remote TA responsible for managing the requested file will send the corresponding combinatorial key and list of servers to the forwarding TA (step 504). The communication between the TAs is assumed to be secure.

Once the TA obtains the combinatorial key, the TA will generate a time stamp (TS) (step 505), which, as explained above, is the sequence number of a next time cycle (TC). A TC is a certain period of time comprising a predefined number of time frames TF of successive clock ticks by a GPS clock on the synchronized network. As discussed in detail below, the TS is used for preventing replay attacks and as a threshold time for allowing the client to access the servers. The TA will then generate and transmit a CONF message to the requesting client (step 506). In accordance with one aspect of the present invention, a CONF message comprises the TS (generated by the TA) and the combinatorial key of the requested file.

For security purposes in the case of a weak adversary (i.e., no eavesdropping), it is to be appreciated that both the REQ and CONF messages can be transmitted in clear text (i.e., not encrypted). To protect against a strong adversary, an asymmetric-key based scheme may be utilized. For instance, assume that the public key ($K_{TA}$) of the TA is known to the clients. Client C can send a REQ message by encrypting it using the $K_{TA}$: $E_{KTA}$ (REQ)=eREQ. The TA can then decrypt the message using its private key and then send back a CONF message which is encrypted by $K_C$: $E_{KC}$(CONF)= eCONF.

Referring back to FIG. 5, upon receiving the CONF message, the client will transmit a POLL (polling) message concurrently to each server based on the server IP addresses, for example, included in combinatorial key so as to obtain the file blocks. A POLL message according to one aspect of the present invention comprises the FID of the requested file, the client's return IP address, and the TS provided by the TA in the CONF message. Upon receiving the POLL message, each server will make a determination as to whether the POLL message was sent in the TC (time cycle) specified by the TS (time stamp) in the CONF message from the TA (step 508). If it is determined that the legitimate client (i.e., an honest client that paid the price for the service) did not POLL the servers during the TC specified by the TS in the CONF message (negative determination in step 508), the client will have to make a new request to its TA (return to step 500).

On the other hand, if the client did POLL the servers during the TC specified by the TS in the CONF message (affirmative determination in step 508), each server will transmit a REP message to the client (step 509) to reply to the polling request by the client. The REP from a given server comprises either a "false" reply (e.g., send a junk block) if the server is not a "holder" of a valid block of the file or, if the server is a holder, a valid block associated with the FID in the POLL message. Thus, a mirror server will always return a REP message in response to a client POLL. However, as stated above, if the request is made for a file for which the server is not a holder, then a "false" reply message is returned. By sending false REPS, it is to be appreciated that an adversary, which randomly polls the servers, is compelled to distinguish between false REPs from valid REPs, which is an extremely difficult (if not virtually impossible) task.

It is to be appreciated that the mirror site servers do not have to perform any authorization and authentication check on client POLLs. It is to be further appreciated that both the POLL and REP messages can be sent in the clear (not encrypted) without compromising security as against both weak and strong adversaries (the security issues are discussed in detail below).

Once the client has received the necessary blocks from the servers (in the REP messages), the client can reconstruct the requested file using the combinatorial key provided by the TA (step 510). Recall that each block comprises two components: "valid" data which is composed of k elements of the file; and a random number of "false" or "junk" elements. The length of the junk part is chosen uniformly randomly between k and g(k). The combinatorial key specifies the information for reconstruction: (1) the value of k, (2) how the junk and valid elements are mixed together, and (3) what the indices of valid elements in a block are. Thus, reconstruction of a file at the client has two passes. First, each block is processed to strip out the junk. Then the valid elements are sorted based on the combinatorial key.

It is to be appreciated that state information in a server can be represented by a lookup table (TBL) which has an entry for each FID that the server is involved with. Preferably, each server periodically updates its lookup table by changing (permuting) the index of each entry at the beginning of each time cycle TC. In accordance with one aspect of the invention, this permutation is performed using a function $\alpha$: TBL, $TC_i \rightarrow \pi_{TC_i}$ which takes the lookup table TBL and the current time cycle $TC_i$ and maps it to a new ordering of the entries. Advantageously, this permutation process can defend against replay attack (as discussed below).

Figure 6:
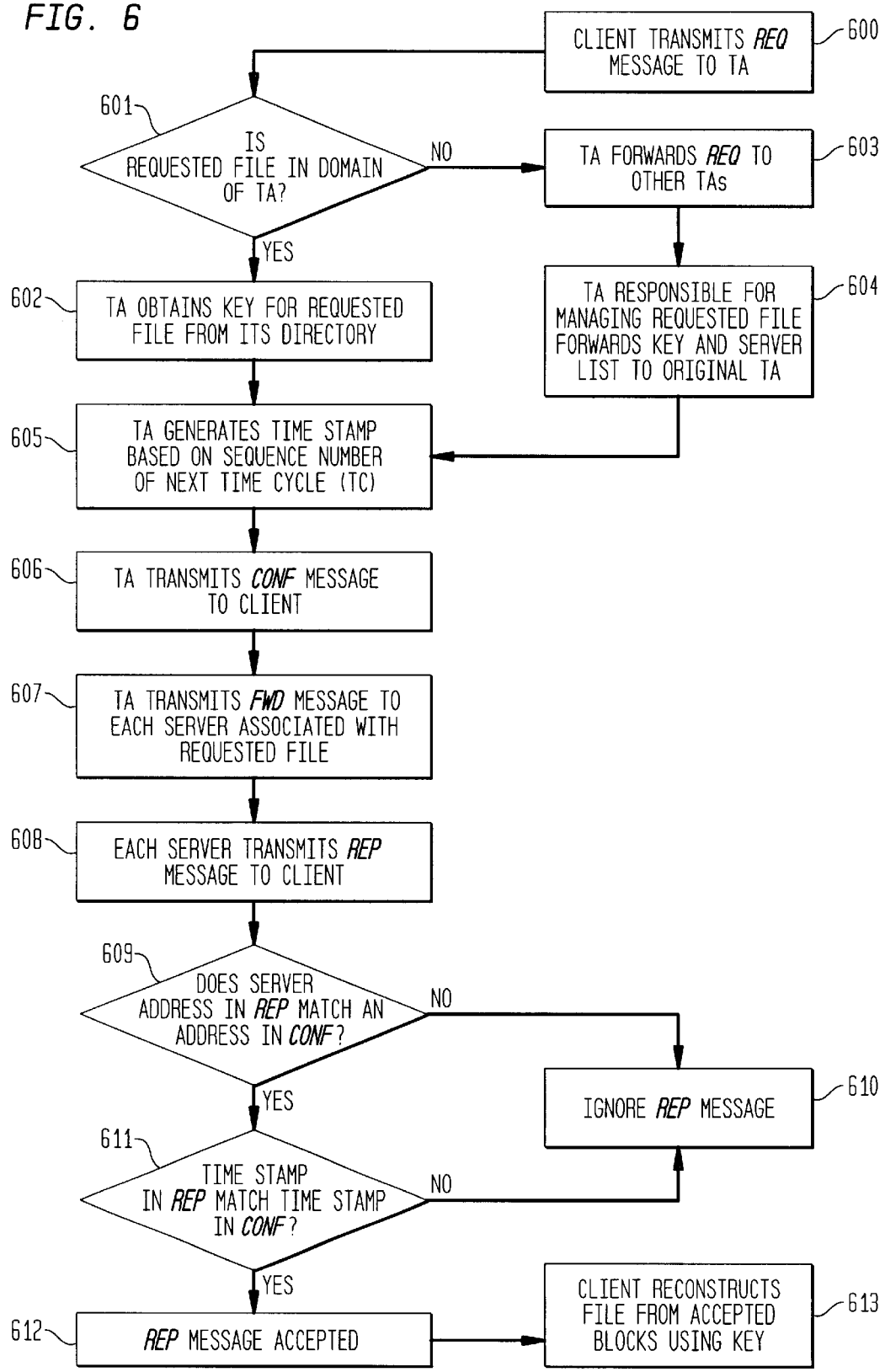
FIG. 6 is a flow diagram of a method for accessing and reconstructing a file according to another aspect of the present invention.

Referring now to FIG. 6, a flow diagram illustrates a method for accessing and reconstructing a file according to another aspect of the present invention. With this method, the client does not query the servers (i.e., send a POLL message) for the blocks, but rather the TA sends a FWD message to the servers requesting delivery of the file blocks to the client. In particular, initially, the client will send a REQ message to its TA to access a file (step 600). The description of steps 600–606 is similar to that discussed above for steps 500–506 of FIG. 5 and, thus, will not be reiterated. Upon sending a CONF message to the client (step accepted (step 612). The client will then reconstruct the file from the blocks contained in the accepted REP messages (step 613) as explained above with respect to step 510 of FIG. 5.

The following Table provides a summary, for example, of the various communication messages and encryption options with respect to the two adversary models:

TABLE 1

|  | Weak Adversary | Strong Adversary |
|---|---|---|
| MESSAGES | | |
| REQ: Client → TA | clear | $EK_{TA}$ (REQ) = eREQ |
| CONF: TA → Client | clear | $EK_C$ (CONF) = eCONF |
| POLL: Client → Server | | clear |
| REP: Server → Client | | clear |
| LOAD: TA → Server | clear | $EK_S$ (LOAD) = eLOAD |
| FWD: Server → Client | | clear |
| STATE INFORMATION | | |
| TA | CK∀FID ∈cluster (TA) | CK,$K_S$ ∀S∈ cluster(TA) |
| Client | Address of TA | $K_{TA}$ |
| Server | Table TBL | $K_{TA}$ |
| SECURITY | | |
| Obtaining a copy of the file | junk blocks and maximizing $$P_x(O) \approx \left[\frac{C(rk, r) - r}{C(rkr)}\right]^{k+\sigma}$$ | |
| Replay attacks | $\alpha$: TBL, $TC_i \to \pi_{TCi}$; $\beta$: FID, $TC_i$ $I_{FID}$ | |
| Eavesdropping | — | $\pi_i$ and junk elements |

606), the TA will also send a FWD message concurrently to each server associated with the file requested by the client (as indicated in the combinatorial key for the file) (step 607). A FWD message according to one aspect of the present invention comprises (1) the address of the requesting client, (2) the FID of the requested file, and (3) a TS (generated in step 605). It is to be appreciated that the FWD message may be transmitted in clear text without compromising security as against both adversary models (weak and strong).

Upon receiving the FWD message, each server will transmit a REP message to the address of the client as indicated in the FWD message (step 608). Each REP message sent by the servers according to one aspect of the invention comprises file blocks associated with the FID passed by the TA in the FWD message (without the client explicitly requesting the blocks), the timestamp received by the TA in the FWD message, and an address of the mirror server. It is to be appreciated that the REP message may be transmitted in clear text to the client without compromising security.

Upon receiving the REP messages from the servers, the client will match the server address in each REP message to the server list (in the combinatorial key) provided by the CONF message to determine if the REP messages are received from servers in the list. If the server address of a given REP message does not match a server address in the list (negative result in step 609), the REP message will be ignored or otherwise deleted (step 610). In addition, the client will compare the TS of each REP message with the TS sent to the client by the TA in the CONF message (step 611). If the TS of a given REP message does not match the TA's TS (negative result in step 612), the REP message will be ignored or otherwise deleted (step 610). Otherwise, each REP message having a valid TS and server address will be In the above Table, $K_{TA}$, $K_S$ and $K_C$ refer respectively to the public key of a TA, a server S, and a client and CK refers to a combinatorial key.

Security Properties

The security properties offered by the present invention will now be discussed in detail. It is to be appreciated that the security provided by the present invention is based on the combinatorial properties of the blocks of file elements and hierarchy embedded into the system.

Weak Adversary

As indicated above, the present invention offers security against weak adversaries. Consider the probability of obtaining the blocks of a file if an adversary can POLL any server in any cluster. It is assumed that the weak adversary can corrupt and collaborate with d≧k nodes. Thus, the adversary has the power to POLL d servers in parallel. Recall that there are S servers in the network and kr blocks of the file are dispersed over them. Similarly there are C(S,kr) ways of choosing kr servers from the total of S without replacement. Again, the first line of security provided by the present invention is due the low probability of the adversary successfully selecting the servers that have valid blocks of a given file.

Next, assume that the adversary is able to identify all the servers associated with the file and POLLs them in parallel to obtain a valid copy of the file. The problem is mapped to the following combinatorial one. Suppose in a jar there are M balls such that K of them are green and M−K are blue. Consider choosing x balls without replacement and consider the probability of obtaining exactly y green balls.

This probability is given by:

$$P_\chi(y) = \frac{C(K,y)C(M-K, x-y)}{C(M,x)} \quad (1)$$

In this mapping, each green ball corresponds to a set of blocks with cardinality d≧k that includes all the blocks of a copy of the file. For simplicity, assume d=k so that each ball contains k blocks. In the above equation 1, C(K,y) is the number of ways of selecting y green balls among K green balls; C(M-K, x-y) is the number of ways of selecting x-y red balls; and C(M,x) is the number of ways of selecting x balls out of M.

As described herein, there are K=r copies of the file and M=C(rk,k) for d=k. What is desired is to compute the probability of getting no green balls with x tries, as our notion of security.

$$P_x(0) = \frac{C(M-K, x)}{C(M,x)} \approx \left(\frac{M-r}{M}\right)^r \quad (2)$$

Of course, this probability will be as small as the number of tries that the adversary can effort. Thus, the price of sampling to limit the tries of the adversary is considered. Assume that the price of the file is a and each polling message costs c. Then, as long as the following holds, the adversary will try to obtain a copy of the file without paying σ:

$$cx \leq \sigma + ck \quad (3)$$

Thus, the cost of random polling will increase as x increases such that if the adversary has a finite budget, it will then stop cheating at some point. Assume X<<M/r is the maximum number of tries the adversary can effort (i.e., Xc≧B). Using the inequality in equation 3, set x=k+(σ/c):

$$P_x(0) \approx \left[\frac{(C(rk,r)-r)}{C(rkr)}\right]^{k+\sigma} \approx (1 - r/(rk)^k)^\sigma (1 - r/(rk)^k)^k \quad (4)$$

which approaches 1 as k increases and, consequently, probability of success for the adversary (i.e., 1-P(x)) decreases accordingly. Thus, the combinatorial security offered by the present invention can advantageously be provided by increasing the number of blocks of the file without the need for any encryption overhead.

Replay Attacks

As indicated above, replay attacks may be averted by periodically permutating the indices of the lookup table at a server. In particular, when a POLL message arrives with a FID and time stamp $TS_i$, the server will substitute the $TS_i$ in place of $TC_i$ and then use a function β: FID, $TC_i, \rightarrow I_{FID}$ to compute the index of the FID in the $\pi_{TCi}$ of the lookup table.

If a POLL message does not yield to a valid index, then the client is either requesting a file that the server does not manage, or the time reference is wrong. In both cases, if I is not a valid index, the server will return "false" reply as indicated above. Thus, if an adversary attempts a replay attack, there will not be a corresponding valid index in the client's directory.

Consider an alternative approach in which the TA periodically sends temporary session keys to each server that it manages. In this approach, the CONF message should include the current key that server will use to encrypt the REP message. The client will use the session key to decrypt the REP message and encrypt the POLL message. An advantage of the present invention, however, is that the permutation based approach eliminates the need for any key distribution between servers and the TA. Servers can provide security by performing only local operations.

Strong Adversary

Recall that POLL and REP messages may be transmitted in the clear. In such a situation, a strong adversary can obtain all the blocks necessary to construct the file by eavesdropping without having to guess them. Assume that an adversary successfully obtains all the blocks of a given file. The protection against eavesdropping is advantageously provided due to the difficulty of finding the permutation $\pi_j$, of the copy j. Indeed, the adversary does not even know the exact number of valid elements in each block when each block has different sizes due to junk elements as described above.

Since the encrypted CONF is the only message that carries the combinatorial key, two lines of defense are provided against the strong adversary. The first line of defense is that the adversary has to identify the junk elements from the valid elements without having the combinatorial key. Secondly, even assuming that the adversary successfully identifies all the valid elements in all the blocks, the adversary must still determine the permutation n associated with that copy to construct the information which has excessive cost $O(|f!|)$ associated therewith.

It is to be appreciated that the present invention can capitalize on the budget constraint of the adversary by assuming that the adversary does not know in advance which links to listen (eavesdrop). Suppose that the cost of eavesdropping to a link is $c and that the budget of an adversary is $B. Since the number of clients is expected to be larger than the number of servers, the adversary may choose to eavesdrop only on the links of the servers. Let δ be the minimum degree of a server (i.e., number of links adjacent to the server) in the cluster. Then choosing c and s such that cδs≧2B ensures that the adversary cannot eavesdrop on all the links of all the servers. Thus, the adversary must a subset of the servers without replacement.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A system for providing secured access to information on a network, comprising:

a plurality of mirror servers; and at least one trusted authority (TA) server comprising file partition means for partitioning a file into a plurality of elements;

combinatorial file dispersal means for permuting the elements of the file and assigning each of the permuted elements to at least one of a plurality of blocks;

distribution means for distributing the plurality of blocks to at least a portion of the plurality of mirror servers; and key generation means for generating a combinatorial key comprising access information for accessing the mirror servers having blocks of the file and reconstruction information for reconstructing the file from at least a portion of the plurality of blocks.

2. The system of claim 1, wherein the combinatorial file dispersal means comprises a cloning-based process which permutes the elements randomly and uses the same permutation for each copy of the file.

3. The system of claim 1, wherein the combinatorial file dispersal means employs a balanced incomplete block design (BIBD)-based process which permutes the elements deterministically using a unique permutation for each copy of the file such that each block is unique in element content.

4. The system of claim 1, wherein the combinatorial dispersal means generates k blocks for the file such that (1) any k−1 blocks are not sufficient for reconstructing the file and (2) there are k+1 combinations of blocks that can reconstruct the file using k blocks.

5. The system of claim 1, wherein the at least one TA server maintains a directory comprising one of a file identifier (FID) for the file, the combinatorial key associated with the file, an address list of the mirror servers holding the blocks of the file, and a combination thereof.

6. The system of claim 1, comprising a network that is partitioned into a plurality of domains, wherein each domain comprises at least one TA server for managing files within the domain and a plurality of mirror servers for holding blocks of the files managed by the respective at least one TA server.

7. The system of claim 1, wherein the combinatorial file dispersal means comprises means for inserting junk elements in the blocks to hide the content and size of the blocks.

8. The system of claim 1, wherein the information comprising the combinatorial key comprises one of a file identifier (FID), an amount of elements associated with the at least one file, an address of each mirror server holding at least one of the blocks, an index and an offset location of each element of the file within the block held by a corresponding mirror server, and a combination thereof.

9. The system of claim 1, further comprising at least one client, wherein the at least one client transmits a request (REQ) message to the at least one TA server to request access to the file, and wherein the at least one TA server transmits a confirmation (CONF) message comprising the combinatorial key to the at least one client.

10. The system of claim 9, wherein the at least one client utilizes the access information of the combinatorial key to transmit a polling (POLL) message to the mirror servers to obtain blocks of the file, and wherein the at least one client utilizes the reconstruction information of the combinatorial key to reconstruct the file using at least a portion of the blocks.

11. A method for accessing information in a network comprising at least one trusted authority (TA) server and a plurality of mirror servers, the method comprising the steps of:
combinatorially dispersing a file into a plurality of blocks by the at least one TA server;
distributing the blocks to at least a portion of the plurality of mirror servers;
generating a combinatorial key by the at least one TA server, the combinatorial key comprising access information for accessing the mirror servers having blocks of the file and reconstruction information for reconstructing the file from at least a portion of the plurality of blocks; and
obtaining the combinatorial key by a client to access blocks of file and reconstruct the file.

12. The method of claim 11, wherein the step of combinatorially dispersing the file elements comprises the steps of:
partitioning the file into a plurality of elements;
permuting the elements; and
assigning each of the permuted elements to at least one of the plurality of blocks.

13. The method of claim 12, wherein the step of permuting the elements is performed using a cloning-based process wherein the elements are randomly permuted and the same random permutation is used for each copy of the file.

14. The method of claim 12, wherein the step of permuting the elements is performed using a balanced incomplete block design (BIBD)-based process wherein the elements are permuted deterministically using a unique permutation for each copy of the file such that each block is unique in element content.

15. The method of claim 12, wherein the step of permuting the elements comprises the step of generating k blocks for the file such that (1) any k−1 blocks are not sufficient for reconstructing the file and (2) there are k+1 combinations of blocks that can reconstruct the file using k blocks.

16. The method of claim 12, further comprising the step of inserting junk elements in the blocks to hide the content and size of the blocks.

17. The method of claim 12, further comprising the step of encrypting the blocks using a secret key to hide the content and size of the blocks.

18. The method of claim 11, wherein the combinatorial key comprises one of a file identifier (FID), an amount of elements associated with the file, an address of each mirror server holding at least one of the blocks, a n index and an offset location of each element of the file within the block held by a corresponding mirror server, and a combination thereof.

19. The method of claim 11, wherein the step of obtaining the combinatorial key by a client to access blocks and reconstruct the file comprises the steps of:
transmitting, by the client, a request (REQ) message to the at least one TA sever for requesting a file, the REQ message comprising a filename of the requested file and an address of the client;
retrieving, by the at least on TA server, a combinatorial key corresponding the requested file;
transmitting a confirmation (CONF) message to the client from the at least one TA server, the CONF message comprising the combinatorial key;
transmitting, by the client, a polling (POLL) message to at least a portion of the plurality of mirror servers based on access information comprising the combinatorial key to obtain blocks of the file, the POLL message comprising a file identifier (FID) of the requested file and an address of client;
transmitting, to the client, a reply (REP) message from each of the mirrors servers to which a POLL message was transmitted, wherein a given REP message comprises at least one block associated with the FID, if the corresponding server is a holder of valid blocks of the file; and
reconstructing the requested file from the blocks using the reconstruction information of the combinatorial key.

20. The method of claim 19, wherein a given REP message comprises a false reply if the corresponding mirror server in not a holder of valid blocks of the file.

21. The method of claim 20, wherein a false REP message comprises a junk block.

22. The method of claim 19, wherein the step of retrieving the combinatorial key comprises the steps of:
retrieving the combinatorial key from a directory of the at least one TA server, if the requested file is within a domain of the at least one TA server; and forwarding the REQ message to at least one additional TA server, if the requested file is within a domain of the at least one additional TA server, to access the combinatorial key of the requested file from the at least one additional server.

23. The method of claim 19, further comprising the steps of:

generating, by the at least one TA server, a time stamp corresponding to a sequence number of a next successive time cycle of a time cycle in which the timestamp is generated, each time cycle comprising a predetermined number of successive time frames of a clock tick of a network clock;

transmitting the timestamp to the client in the CONF message;

transmitting the timestamp from the client to the mirror servers in the POLL message; and determining, by each mirror server receiving the POLL message, whether the POLL message was received in a time cycle corresponding to the timestamp in the POLL message;

wherein the step of transmitting the REP message is performed by the mirror servers only if the POLL message was received in the time cycle corresponding to the timestamp.

24. The method of claim 11, wherein the step of obtaining the combinatorial key by a client to access blocks and reconstruct the file comprises the steps of:

transmitting, by the client, a request (REQ) message to the at least one TA sever for requesting a file, the REQ message comprising a filename of the requested file and an address of the client;

retrieving, by the at least on TA server, a combinatorial key corresponding the requested file;

transmitting a confirmation (CONF) message to the client from the at least one TA server, the CONF message comprising the combinatorial key;

transmitting, by the at least one TA server, a forward (FWD) message to at least a portion of the plurality of mirror servers based on access information comprising the combinatorial key, the FWD message comprising a file identifier (FID) of the requested file and an address of client;

transmitting, to the client, a reply (REP) message from each of the mirrors servers to which a FWD message was transmitted, wherein a given REP message comprises at least one block associated with the FID and an address of the mirror server;

accepting all REP messages having an address of a mirror server that corresponds with the access information of the combinatorial key of the CONF message;

reconstructing the requested file from the blocks of the accepted REP messages using the reconstruction information of the combinatorial key.

25. The method of claim 24, further comprising the steps of:

generating, by the at least one TA server, a timestamp based on a sequence number of a next successive time cycle of a time cycle in which the timestamp is generated, each time cycle comprising a predetermined number of time frames of a clock tick of a network clock;

transmitting the timestamp, by the at least one TA server, to the client in the CONF message and to each mirror server in the FWD message;

transmitting the timestamp received by the mirror servers in the FWD message to the client in the REP messages; and accepting the REP messages having a timestamp that corresponds to the timestamp of the CONF message.

* * * * *